Nov. 20, 1956  E. T. KIERNAN  2,770,938
POWER TOOL FOR LAWN MAINTENANCE
Filed May 4, 1953  4 Sheets-Sheet 1

INVENTOR.
EDWARD T. KIERNAN
BY
ATTORNEY.

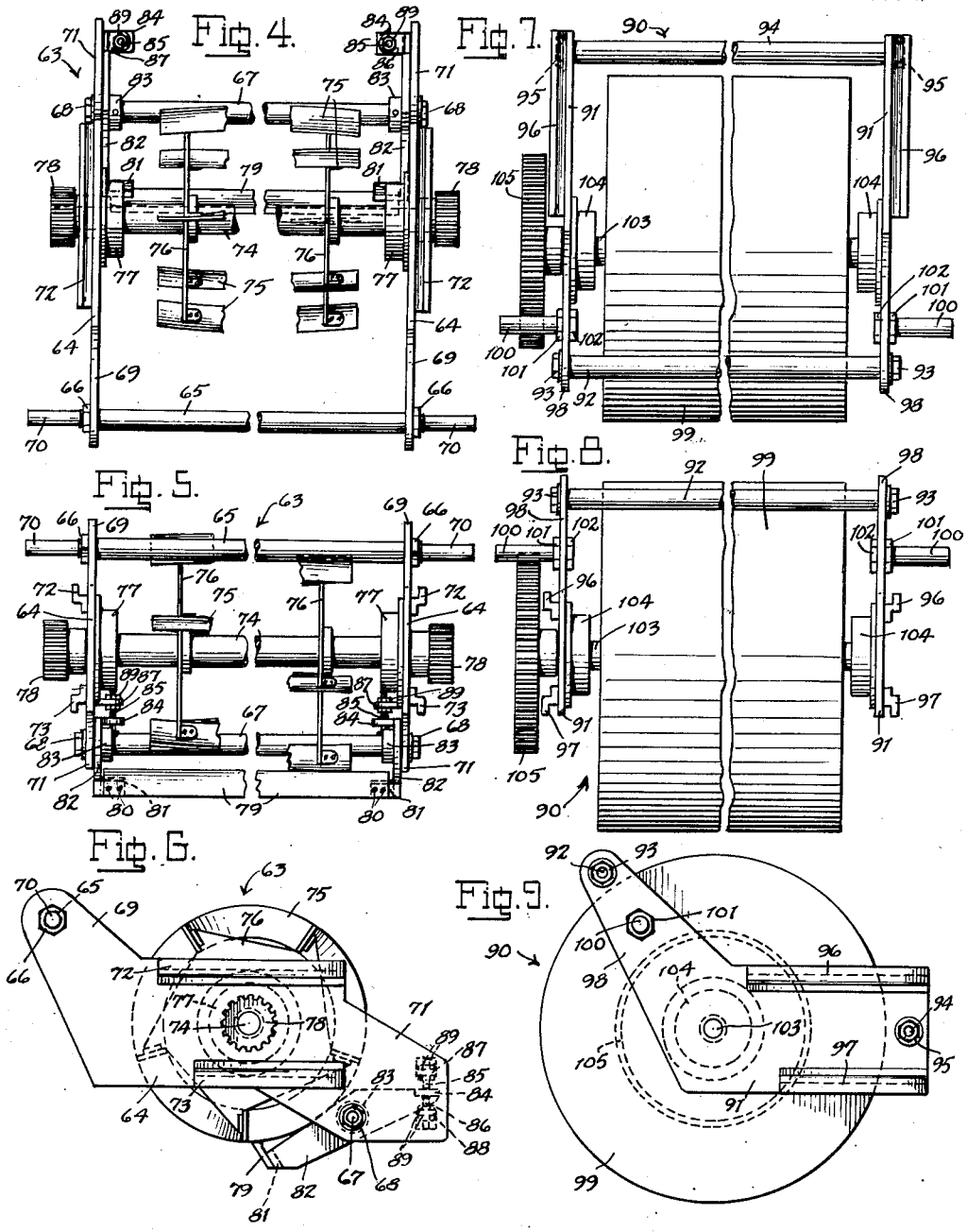

Nov. 20, 1956  E. T. KIERNAN  2,770,938
POWER TOOL FOR LAWN MAINTENANCE
Filed May 4, 1953  4 Sheets-Sheet 3
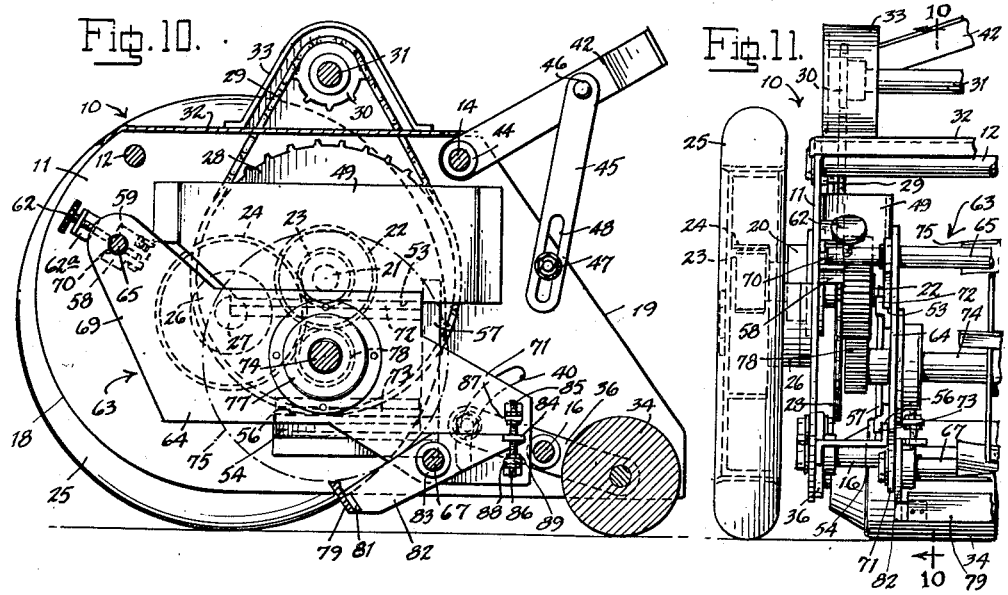
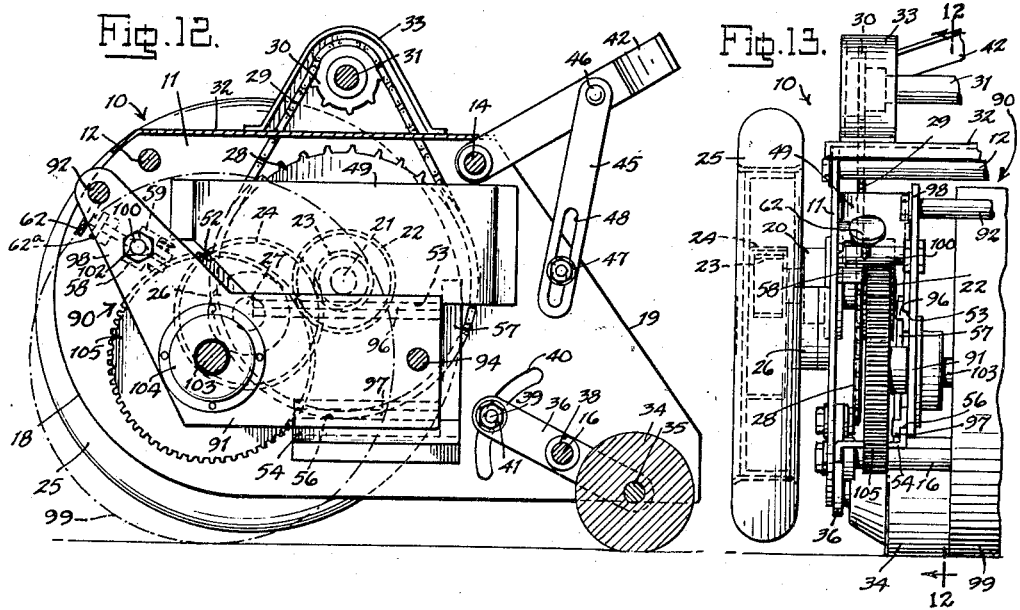
INVENTOR.
EDWARD T. KIERNAN
BY
ATTORNEY.

Nov. 20, 1956     E. T. KIERNAN     2,770,938
POWER TOOL FOR LAWN MAINTENANCE
Filed May 4, 1953     4 Sheets-Sheet 4
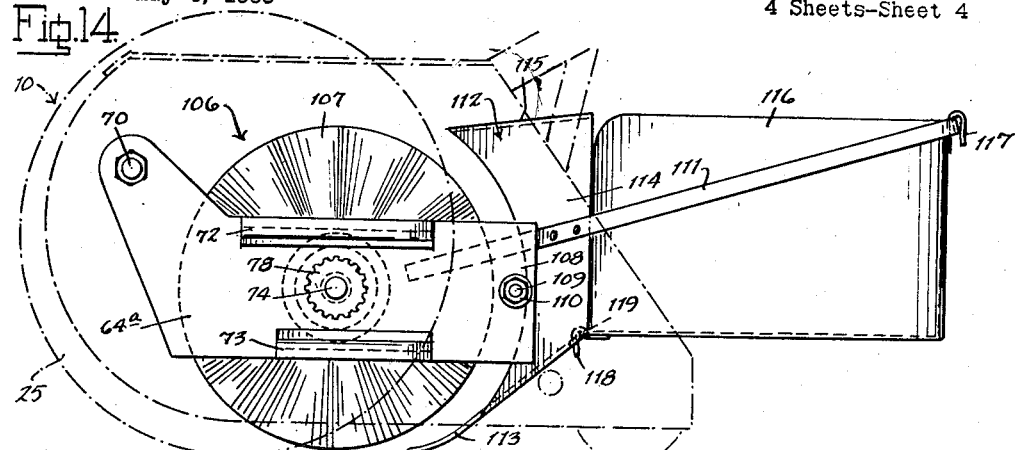
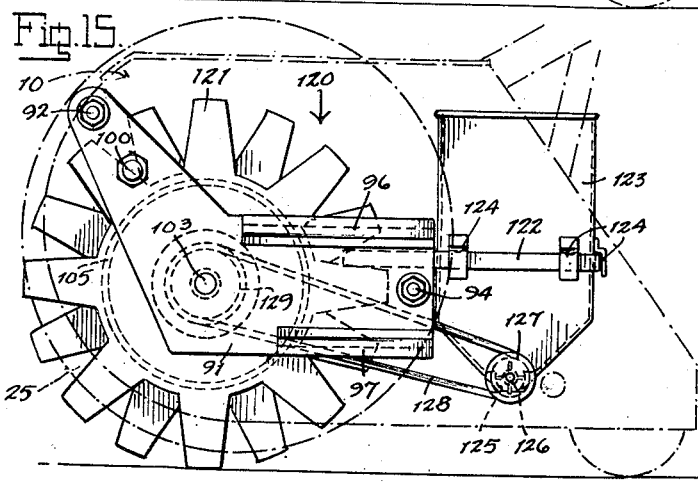
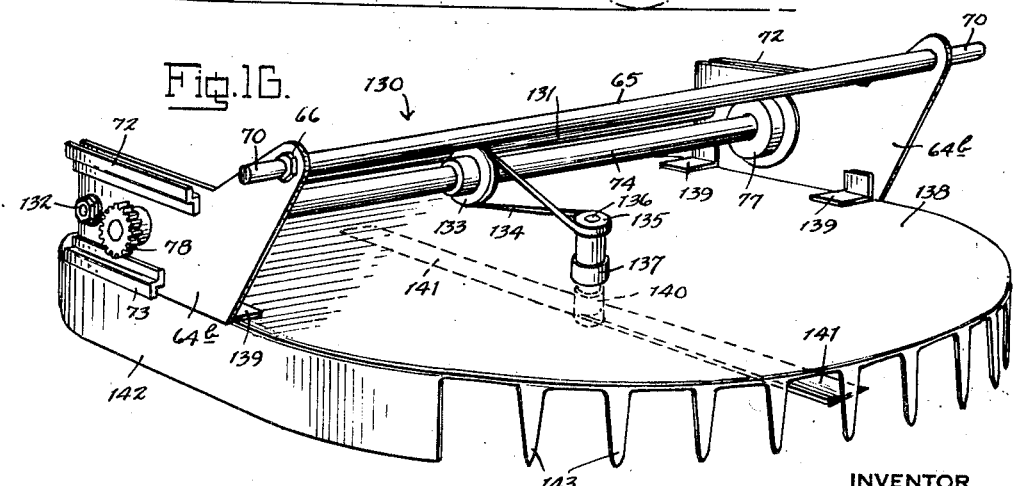
INVENTOR
EDWARD T. KIERNAN
BY
ATTORNEY

United States Patent Office 2,770,938
Patented Nov. 20, 1956

2,770,938

POWER TOOL FOR LAWN MAINTENANCE

Edward T. Kiernan, Long Hill, Conn.

Application May 4, 1953, Serial No. 352,703

5 Claims. (Cl. 56—2)

The present invention relates to a power tool for lawn maintenance, particularly a power tool having a plurality of interchangeable units whereby the tool may be converted for use as a mower, sweeper, roller, cultivator, etc.

An object of the invention is to provide a tool of this character in which the conversion from one unit to the other may be quickly carried out with very little effort on the part of the operator, simply by sliding one unit out of place and sliding another unit into place, this operation taking place through a substantially straight line horizontal movement of the units.

A further object is to provide a power tool in which the interchangeable units may be fixed in place by a simple fastening means without the necessity for connecting drive chains or other similar means, the driving connection to the respective units being automatically carried out through the interengagement of the parts.

A further object is to provide a tool wherein the several units may be driven at desirable characteristic speeds, for example, the mower and sweeper units may be driven at relatively high speed, while the roller and cultivator units may be driven at relatively low speed.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 1 is a plan view partially broken away of the main frame or chassis of the tool carrying the driving motor and traction wheels, the motor supporting top plate and the motor being removed for clearness of illustration;

Fig. 2 is a longitudinal sectional view taken along the line 2—2 of Fig. 1, showing the inner side of one side member of the frame;

Fig. 3 is a front elevation of the right hand side of the main frame;

Fig. 4 is a plan view partially broken away of the mower unit removed from the main frame;

Fig. 5 is a front elevation thereof;

Fig. 6 is a side elevation as seen from the right in Figs. 4 and 5;

Fig. 7 is a plan view partially broken away of the roller unit removed from the frame;

Fig. 8 is a front elevation thereof;

Fig. 9 is a side elevation as seen from the right in Figs. 7 and 8;

Fig. 10 is a longitudinal sectional view taken along the line 10—10 of Fig. 11, showing the mower unit assembled with the main frame, the relative position of the mower reel being shown in dot-and-dash lines;

Fig. 11 is a front elevation of the right hand side of the tool as seen in Fig. 10;

Fig. 12 is a longitudinal vertical sectional view taken along the line 12—12 of Fig. 13, showing the roller unit assembled with the main frame, the relative position of the roller being shown by dot-and-dash lines;

Fig. 13 is a front elevation of the right hand side of the tool as seen in Fig. 12;

Fig. 14 is a side elevation of the sweeper unit removed from the main frame, a grass catching basket being shown attached thereto;

Fig. 15 is a side elevation of the cultivator unit removed from the main frame, a fertilizer or seed spreading receptacle being shown attached thereto; and Fig. 16 is a perspective view showing a modified form of the mower unit having a rotary disc type cutter blade.

Referring to the drawings, and more particularly to Figs. 1–3, the main frame or chassis of the power tool, generally indicated as 10, comprises a pair of side frame members or plates 11—11, preferably formed of suitable heavy gage sheet steel, and rigidly connected together by an upper forward horizontal cross rod 12 secured at its reduced threaded ends in holes in the side plates by end nuts 13, an upper rearward horizontal cross rod 14 similarly secured at its reduced threaded ends in holes in the side plates by end nuts 15, and a lower rearward horizontal cross rod 16 also similarly secured at its reduced threaded ends in holes in the side plates by end nuts 17. The upper and lower edges of the side plate are horizontal and parallel to each other, the forward edge 18 is convexly rounded and the rearward edge 19 is inclined downwardly and rearwardly so that the lower portions of the side plates project rearwardly to a substantial degree.

Upon each side plate 11 there is mounted, in a suitable anti-friction bearing 20 secured to the frame, a jack shaft 21 projecting at each side of the plate, this jack shaft being provided upon its inner end with a spur gear 22 and upon its outer end with a spur pinion 23 which meshes with a spur gear 24 secured within the traction wheel 25 in concentric relation to the hub 26 of the wheel, the latter being mounted upon a stub or stud shaft 27 secured upon the outer side of the side plate 11. Suitable anti-friction ball or roller bearings, not shown, are preferably interposed between the stud shaft and the wheel hub.

A sprocket gear 28 is rigidly secured to the outer side of the spur gear 22 provided upon one of the side plates, the right hand side plate as shown, and which is driven by a sprocket chain 29 by a sprocket gear 30 secured upon a motor driven shaft 31 suitably supported upon the motor supporting top plate 32 secured upon the upper sides of the two side plates 11 and extending between them. The sprocket gear 30 is enclosed within a suitable guard 33 secured upon the top plate 32. A driving motor, not shown, is mounted upon the plate 32 and drives the shaft 31, a suitable clutch preferably being provided between the motor and the shaft 31. As the motor and clutch are of conventional type, such as used in conventional power mowers, an illustration of these parts is not deemed necessary to an understanding of the invention.

It will be seen that the traction wheel 25 at the right hand side is driven through the sprocket chain 29, and that the wheel 25 at the left hand side is not driven except when one of the units, as for example the mower unit, is in place, as will presently more fully appear. In such case, the unit has gears meshed with the gears 22—22 at each side and, as the gear 22 at the right hand side drives such unit, it in turn drives the gear 22 and the wheel 25 connected thereto at the left side.

Rearwardly of the wheels 25 there is provided between the side plates 11 a ground engaging support roller 34 having its shaft ends 35 rotatably mounted in the rearward ends of lever arms 36—36 respectively pivotally supported upon the inner sides of the side plates 11, each lever being provided intermediate its ends with a hole 37 through which it is pivotally mounted upon the cross rod 16 where it is retained adjacent the inner side of the side plate against lateral movement by a collar 38 secured upon the rod. The forward end of the lever carries a bolt 39 engaged in an arcuate slot 40 in the side plate 11 concentric to the shaft 16 and through which the lever may be pivoted to change the height of the roller 34, the shifted position being fixed by tightening the nut 41 on the bolt 39.

A suitable handle means is provided for the frame, such handle means being connected thereto by a yoke member 42 having its respective sides pivotally connected to the upper rearward cross rod 14, being provided with a hole 43 engaged by the rod, and being retained against lateral displacement by a collar 44 fixed upon the rod. Angular adjustment of the handle is brought about by a strut member 45 at each side of the yoke member 42, each pivotally connected at 46 thereto and connected to the adjacent side plate 11 by a bolt 47 fixed on the side plate and engaging a longitudinal slot 48 in the strut member, so that upon loosening of the bolt 47 the angle of the handle may be adjusted as desired.

Upon the inner side of each side plate 11 there is provided a tool support or horizontal track way for receiving the mower and other interchangeable units, as will presently more fully appear, this trackway being provided by an upper strap member 49 disposed in inwardly spaced relation to the spur gear 22 and having its ends 50 and 51 rigidly secured to the side plate by welding, riveting, or the like. The forward side of the strap member 49 is cut away as at 52 to provide forward clearance for the relatively large gear of the roller unit which is brought into mesh with the gear 22 upon assembly of the roller unit, as will hereinafter more fully appear.

In downwardly spaced parallel relation to the lower horizontal edge 53 of the strap member 49 there is provided a bracket member 54, having a mounting flange 55 riveted or otherwise rigidly secured to the side plate 11, and having an upper horizontal track edge 56 in opposed spaced parallel relation to the track edge 53. A vertical strip 57 is connected between the rearward end of the bracket member 54 and the strap member 49, so as to insure a rigid relation between the bracket and the strip, and also to provide a rearward limit stop for the unit which is engaged with the track edges 53 and 56. The free space 144 between the trackways at each side is laterally unobstructed and is open forwardly for the insertion and removal of the mower or other unit, as will presently more fully appear.

Secured upon each of the side plates 11 is a locking device for the inserted unit, which consists of a lower jaw member 58 fixed to the side plate by welding, riveting, or the like, and an upper jaw member 59 yieldably mounted in opposed relation to the jaw member 58 upon a pin 60 having a spring 61 thereon, which bears downwardly upon the upper jaw member while permiting it to yield upwardly to a limited degree. The jaw members are disposed at an upwardly and forwardly inclined angle and in opposed aligned relation therewith is a screw 62 having a manually operable knurled head, and which is threaded in a bracket 62a rigidly secured by welding, riveting or the like, to the side plate. The locking device is such that in the outwardly moved position of the screw 62 a horizontally unobstructed space is provided through which a pin carried by the mower or other unit may be moved into relation with the jaws as the unit is moved into place, the screw thereupon being screwed down against the end and forcing it tightly into the jaws to thus lock the unit in place.

The mower reel unit, generally indicated as 63 and shown in separated relation in Figs. 4–6, comprises a frame including a pair of side plates 64—64, preferably formed of suitable heavy gage sheet steel, and rigidly connected together by an upper forward horizontal cross rod 65 secured at its reduced threaded ends in holes in the side plates by end nuts 66, and a lower rearward horizontal cross rod 67 similarly secured at its reduced threaded ends in holes in the side plates by end nuts 68. The forward cross rod 65 is secured between upwardly and forwardly extending arm portions 69 of the side plates, and upon each end of the rod 65 there is provided a pin extension 70 which is adapted, as will hereinafter more fully appear, to engage with the locking device provided upon each of the side plates 11 of the main frame 10. The rearward cross rod is connected between downwardly and rearwardly extending arm portions 71 of the side plates 64 and is adapted, as will presently more fully appear, to support an adjustable cutter bar.

The upper and lower edges of the intermediate portions of the side plates 64 are horizontally disposed and upon the outer side of each side plate, in parallel relation with these upper and lower edges, there are respectively secured by welding, riveting, or the like, upper and lower right angle cross-section guide strips 72 and 73. These guide strips form channel guideways along the upper and lower edges of the side plates 64 and are adapted for sliding engagement with the parallel spaced track edges 53 and 56 of the strap member 49 and bracket member 54 carried by the main frame 11, the transverse spacing of the side plates 64 being such that they will fit between the inwardly disposed surfaces of the straps 49 and brackets 54 with the channel guide-ways formed by the guide strips or tool support engaging means 72 and 73 engaged by the edges 53 and 56, the interengagement between the reel unit and the main frame rigidly holding them against relative transverse movement.

As the reel is horizontally moved into engagement with the main frame from the forward end of the latter, the pin extensions 70 move into engagement with the V-shaped jaws of the locking device members 58 and 59, the manually operable screw 62 being first screwed outwardly, as seen in Fig. 2, to provide an unobstructed horizontal space for movement of the pins into place. The rearward ends of the guide strips 72 and 73 abut the vertical strips 57 at each side to limit the engaging movement, and the screws 62 are screwed down against the pin extensions 70 thus locking the unit in place. It will be observed that the upper jaw members 59 of the locking devices are yieldable so that a tight engagement of the reel unit with the main frame will take place irrespective of slight dimensional tolerances and wear, which might otherwise result in looseness.

A cutter reel shaft 74, having a series of helical cutter blades 75 carried thereby upon spider hubs 76, is rotatably mounted at its ends in suitable antifriction bearings 77 mounted upon the inner sides of the side plates 64 and upon the projecting ends of the shaft 74 there are respectively secured spur gears 78—78 which, as shown in Figs. 10 and 11, mesh with the spur gears 22 respectively carried upon each side of the main frame. Thus as the sprocket gear 28 is driven it drives the right hand traction wheel 25 through the pinion 23 and gear 24 in counterclockwise direction, and at the same time the gear 22 secured to the sprocket gear turns the gear 78 at the right hand side of the reel in counterclockwise direction to thus rotate the reel in counterclockwise direction. The pinion 78 carried at the left hand side of the reel in turn rotates the spur gear 22 at the left hand side of the main frame and through the pinion 23 and gear 24 rotates the left hand traction wheel 25.

The cutter bar 79 is secured at its ends by screws 80 to the forward lug portions 81 of a pair of lever arms 82 pivotally mounted intermediate their ends upon the cross rod 67 adjacent the inner sides of each of the side plates 64, being retained against sidewise movement by a collar 83 secured upon the rod 67 adjacent the inner side of each of the lever arms. Each lever arm is provided at its rearward end with a horizontally extending lug 84 disposed between a pair of vertically arranged adjustment screws 85 and 86 respectively mounted in angle brackets 87 and 88 secured by welding, riveting or the like, to the side plates. Lock nuts 89 are provided at the upper and lower sides of each of the brackets to fix the position of adjustment of the respective screws. Thus, by adjustment of the screws 85 and 86 the cutter bar may be swung upwardly or downwardly to regulate the cutting relation with the cutting edges of the blades 75.

In order to remove the mower reel unit 63 from the main frame 10, for the purpose of making adjustments or repairs thereon or for replacing the mower reel unit with the roller, sweeper or other interchangeable unit of the invention, it is only necessary to screw the manually operable screws 62 outwardly to a point where the pin extensions 70 are horizontally unobstructed, and thereupon the reel unit may be moved forwardly to disengage the guide strips 72 and 73 from the track edges 53 and 56 of the main frame.

The roller unit, indicated generally as 90 and shown in separated relation in Figs. 7–9, comprises a pair of side plates 91—91 rigidly connected together by an upper forward horizontal cross bar 92 secured at its reduced threaded ends in holes in the side plates by end nuts 93, and a rearward horizontal cross rod 94 similarly secured at its reduced threaded ends in holes in the side plates by end nuts 95. The side plates 91 are generally similar in design to the side plates 64 of the mower reel unit 63 and each is provided at its outer sides along its upper and lower horizontal edges with channel-forming guide strips 96 and 97 similar to the guide strips 72 and 73 of the mower reel unit.

Each of the side plates is provided with an upwardly and forwardly extending arm portion 98 between the upper ends of which the cross rod 92 is connected at a point outwardly of the circumference of the roller 99. Upon each of the arm portions 98 of the side plates, at points corresponding to the placement of the pin extensions 70 upon the side plates of the mower reel unit 63, there are respectively secured horizontal pin members 100 fixed to the arm by nuts 101 and 102 screwed upon threaded ends of the pins at each side of the arm. As the arrangement of the guide strips 96 and 97 and the pins 100 corresponds to the guide strips 72 and 73 and the pin extensions 70 of the mower reel unit, it will be seen that the roller unit is adapted to be engaged and disengaged with the main frame in the same manner as the engagement and disengagement of the mower reel unit, the engaged relation of the roller unit being shown in Figs. 12 and 13.

The roller 99 is mounted upon a shaft 103 having its ends rotatable in antifriction bearing units 104 respectively mounted upon the inner sides of the side plates 91. The right hand end of the shaft 103 is extended outwardly from the right hand side plate 91 and has secured thereon a large spur gear 105. It is pointed out that the roller is adapted to engage the ground with the traction wheels 20 raised from the ground, as shown in Figs. 12 and 13, the turning of the roller thus propelling the apparatus. The roller is adapted to turn at a considerably lower speed than the turning of the cutter reel, in the case of the mower unit, and to this end the gear 105 which meshes with the sprocket driven gear 22 at the right hand side of the main frame is of substantially greater diameter than the gear 78 of the mower cutter reel. Consequently the shaft 103 of the roller is placed substantially forwardly of the side plates 91, as compared to the position of the cutter reel shaft 74 upon the side plates 64 of the mower reel unit, so that the large gear 105 will mesh with the gear 22 as the roller unit is moved horizontally into place in the main frame. As the sprocket 28 is rotated the roller is rotated in counterclockwise direction through the gears 22 and 105, and at the same time the right hand traction wheel 25, which is raised from the ground as shown in Figs. 12 and 13, will also be driven in a counterclockwise direction. However, as there is no gear similar to the gear 105 at the left hand end of the roller, the left hand traction wheel 25 will remain idle.

It will be observed that the support roller 23 at the rearward end of the main frame is adapted, when the mower unit is in place, to be adjusted to vary the cutting height of the reel, as shown in Figs. 10 and 11, and, when the roller unit is in place, is adapted to be adjusted to bring the main frame into a substantially horizontal position, as shown in Figs. 12 and 13.

In Fig. 14 there is shown a sweeper unit, indicated generally as 106, which is generally similar to the reel type mower unit 63 except that instead of the cutting reel, the shaft 74 has mounted thereon a cylindrical sweeper brush 107 which in the mounted relation in the main frame 10, partially indicated by dot-and-dash lines, has its periphery raised from the ground by the traction wheels 25. This sweeper is adapted to be driven at the same high speed as the reel of the mower unit and consequently the shaft 74 is provided at its ends with the gears 78 which mesh with the wheel gears 22 of the main frame. The side plates 64a of the sweeper unit are somewhat different in design from the side plates 64 of the mower unit in that they are not adapted to support a cutter bar. The plates 64a are rearwardly extended at 108 beyond the periphery of the sweeper brush and are connected by a cross rod 109 having its reduced threaded ends engaged in holes in the side plates and secured by nuts 110.

A basket supporting yoke-shaped frame 111 is secured at its forward ends to the inner sides of the side plates 64a and supports a guard member 112 which is adapted to guide the grass swept by the sweeper into a receiving basket, this guard having a lower wall 113 inclined upwardly and rearwardly and having its forward end just back of the periphery of the sweeper brush, side walls 114 which are secured to the sides of the yoke frame 111, and a deflector top wall 115 which deflects the grass thrown upwardly by the sweeper. A basket 116 is removably connected to the frame by a hook 117, engaged over the rearward end of the yoke frame 111, and hooks 118 at its forward edge which are hooked into slots 119 in the rearward end of the lower wall 113 of the guard member 112.

In Fig. 15 there is shown a cultivator unit, indicated generally as 120, which is generally similar to the roller unit 90, except that instead of a roller mounted upon the shaft 103, a series of pointed cultivator discs 121 are mounted thereon. In this case, like the roller, the cultivator discs engage the ground and provide traction for propelling the apparatus, the traction wheels 25 of the main frame 10, partially indicated by the dot-and-dash lines, being raised from the ground.

The cultivator may also be utilized for spreading fertilizer or seeds which may be spread upon the ground following the action of the toothed discs of the cultivator thereon. To this end a yoke-shaped frame 122 is secured to the inner sides of the side plates 91 and supports a hopper 123 having hook members 124 upon its side and rear walls removably engageable with the frame 122. The lower end of the hopper converges to a slot 125 in which is disposed a rotatable vaned valve member 126 which normally seals the slot but which, upon rotation, feeds a measured quantity of the contents of the hopper through the slot. This is a conventional type of fertilizer or seed spreader and no claim is made to the specific structure thereof. For the purpose of rotating the valve member 126, it is provided upon its end with a pulley wheel 127 driven by a belt 128 from a pulley wheel 129 mounted upon the shaft 103.

In Fig. 16 there is shown a rotary type mower unit indicated generally as 130. The side plates 64b are somewhat similar in design to the side plates 64 of the reel type mower unit 63 except that they are not adapted to support a cutter bar. In order to provide transverse bracing supports in place of the rod 67, a rod 131 extends between the side plates and has its reduced threaded ends engaged in holes in the side plates and secured by nuts 132. The shaft 74, which in the case of the reel type mower unit is provided with a cutting reel, is provided at a substantially central point with a pulley wheel 133 connected by a belt 134 with a pulley wheel 135 mounted upon the upper end of a vertical shaft 136 rotatable in a bearing 137 provided centrally of a cover plate 138 which extends between the side plates and is secured to their inner sides by angle brackets 139. Upon the lower end of the shaft 136 there is secured the hub 140 of a pair of radially extending rotary cutter blades 141.

The plate 138 is preferably provided with a downwardly extending peripheral flange 142 along its side and rear edges, and along its forward edge is provided with a series of downwardly extending spaced teeth 143 between which the grass to be cut by the blades moves as the mower is propelled forwardly. The rotary mower unit is adapted to be engaged with the main frame in a similar manner to the reel type mower unit 63, the shaft 74 being provided at each of its ends with gears 78 which mesh with the wheel gears 22, so that as the traction wheel 25 at the right hand side is driven through the sprocket gear 28, the shaft 74 is rotated, and in turn drives the traction wheel at the left hand side. At the same time the rotary cutter blades 141 are rotated through the belt drive from the shaft 74.

What is claimed is:

1. A power tool of the character described, comprising a main frame including a pair of side frame members, a pair of ground engaging traction wheels, a stub shaft rotatably mounting one traction wheel on the outer side of one side frame member, a stub shaft rotatably mounting the other traction wheel on the outer side of the other side frame member, gearing carried by said one side frame member connected to said one traction wheel for rotation of said wheel and gearing through turning of one by the other and including a transverse horizontal shaft rotatable in said one side frame member and a spur gear carried by said shaft at the inner side of said one frame member, gearing carried by said other side frame member connected to said other traction wheel for rotation of said wheel and gearing through turning of one by the other and including a transverse horizontal shaft rotatable in said other side frame member and a spur gear carried by said shaft at the inner side of said other side frame member, said horizontal shafts being axially aligned and laterally spaced from each other to provide a free space between them, a motor driven shaft carried by said main frame, driving means connected between said motor driven shaft and said gearing carried by said one side frame member to drive said gearing, a pair of tool supports, one mounted on one of said side frame members and the other mounted on the other side frame member at the respective sides of said free space, and a tool unit removably engageable in said free space and including a frame having transversely spaced sides, a pair of tool support engaging means carried by said respective sides of said unit removably engageable with said respective tool supports, a transverse horizontal shaft rotatably mounted in said sides of said tool unit frame, and a pair of spur gears, one mounted upon each end of said transverse horizontal shaft of said unit outwardly of said sides of said tool unit frame, said last mentioned spur gears being laterally spaced apart a substantially corresponding distance to the lateral spacing of said first mentioned spur gears and adapted to respectively mesh and unmesh with said respective first mentioned spur gears upon respective engagement and removal of said tool unit relative to said free space.

2. The power tool as defined in claim 1, further characterized by a ground engaging support roller carried by said main frame rearwardly of said free space, said free space being open at its forward side, and said pair of tool supports comprising a pair of horizontal laterally spaced parallel track ways open at their forward ends whereby said pair of tool support engaging means are engageable with and disengageable from said respective track ways through respective inward and outward horizontal movement of said tool unit through said open forward side of said free space, and locking means cooperating between said main frame and said tool unit for releasably retaining said tool unit in engagement with said track ways.

3. The invention as defined in claim 1, further characterized in that said tool unit includes rotary cutter reel blades secured to said shaft.

4. The invention as defined in claim 1, further characterized in that said tool unit includes rotary sweeper brush means secured to said shaft.

5. The invention as defined in claim 1, further characterized in that said tool unit includes a rotary cutter blade carried by said unit and rotatable about a vertical axis, and drive means for said rotary cutter blade connected to said shaft.

References Cited in the file of this patent

UNITED STATES PATENTS

| | | |
|---|---|---|
| 1,039,490 | Coldwell | Sept. 24, 1912 |
| 2,053,535 | Schielein | Sept. 8, 1936 |
| 2,368,290 | Donald | Jan. 30, 1945 |
| 2,429,378 | Stuebner | Oct. 21, 1947 |
| 2,715,808 | Heineke | Aug. 23, 1955 |